United States Patent Office 2,771,466
Patented Nov. 20, 1956

2,771,466

5-NITROTHIAZOLEAZO-N,N-DISUBSTITUTED M-ALKACYLAMINOANILINE COMPOUNDS

Edmund B. Towne and Joseph B. Dickey, Kingsport, Tenn., assignors to Eastman Kodak Company, Rochester, N. Y., a corporation of New Jersey No Drawing. Application February 13, 1953,
Serial No. 336,871

3 Claims. (Cl. 260—158)

This invention relates to new azo compounds and their application to the art of dyeing or coloring.

We have discovered that the azo compounds having the general formula:

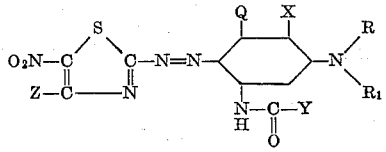

wherein R represents a hydroxyalkyl group having 2 to 5, inclusive, carbon atoms, $R_1$ represents an alkyl group having 1 to 6, inclusive, carbon atoms or a hydroxyalkyl group having 2 to 5, inclusive, carbon atoms, X represents a hydrogen atom, a methoxy group, an ethoxy group, an acetylamino group, a propionylamino group or a butyrylamino group, Q represents a hydrogen atom, an acetylamino group, a propionylamino group or a butyrylamino group, Y represents an alkyl group having 1 to 3, inclusive, carbon atoms, Z represents a hydrogen atom, an alkyl group having 1 to 6, inclusive, carbon atoms, a cyano group, a trifluoromethyl group, a phenyl group, a p-nitrophenyl group or a m-nitrophenyl group and wherein one of the members Q and X must be a hydrogen atom, are valuable dyes for coloring textile materials made of or containing a cellulose alkyl carboxylic acid ester having 2 to 4 carbon atoms in the acid groups thereof. They are especially of use for the coloration of cellulose acetate textile materials. When applied to the aforesaid textile materials, they give reddish-blue, blue, greenish-blue and bluish-green dyeings which, in general, have good to excellent fastness to light, excellent fastness to gas, good wash fastness, good fastness to crocking and which give sharp and white discharges, especially on cellulose acetate fabrics. Additionally, these dye compounds dye deeply and evenly at low temperatures and yield bright shades on the aforesaid textile materials. The compounds of our invention also color wool, silk, nylon, polyethylene terephthalate and modified polyacrylonitrile textile materials similar shades. Of great importance is the fact that many of these dye compounds yield dyeings which do not show the red shift in shade when moved from daylight to artifical light.

It is an object of our invention to provide new azo compounds. Another object is to provide a satisfactory process for the preparation of our new azo compounds. A further object is to provide dyed textile materials, especially cellulose acetate textile materials, which have good fastness to light and gas.

By cellulose alkyl carboxylic acid esters having 2 to 4 carbon atoms in the acid groups thereof, we mean to include, for example, both hydrolyzed and unhydrolyzed cellulose acetate, cellulose propionate, cellulose butyrate, cellulose acetate propionate and cellulose acetate butyrate.

The new azo compounds of our invention are prepared by diazotizing a 2-amino-5-nitrothiazole having the formula:

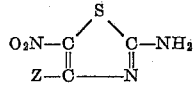

and coupling the diazonium compound obtained with a compound having the formula:

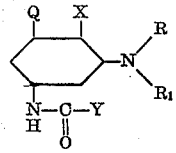

Q, R, $R_1$, X, Y and Z in the foregoing formulas have the meaning previously assigned to them.

Typical of the 2-amino-5-nitrothiazole compounds used in the preparation of the azo compounds of our invention are: 2-amino-5-nitrothiazole, 2-amino-4-methyl-5-nitrothiazole, 2-amino-4-ethyl-5-nitrothiazole, 2-amino-4 - n - butyl - 5 - nitrothiazole, 2 - amino - 4 - n - hexyl-5-nitrothiazole, 2-amino-4-cyano-5-nitrothiazole, 2-amino-4-trifluoromethyl-5-nitrothiazole, 2-amino-4-phenyl-5-nitrothiazole, 2-amino-4-(m-nitrophenyl)-5-nitrothiazole and 2-amino-4-(p-nitrophenyl)-5-nitrothiazole. The use of 2-amino-5-nitrothiazole is ordinarily preferred.

Illustrative of the hydroxyalkyl groups represented by R and $R_1$ are the β-hydroxyethyl, the β-hydroxypropyl, the γ-hydroxypropyl, the β,γ-dihydroxypropyl, the β-methyl-β,γ-dihydroxypropyl, the δ-hydroxybutyl, the ε-hydroxyamyl and the δ,ε-dihydroxyamyl groups. Illustrative of the alkyl groups represented by R and Z are the methyl, the ethyl, the n-propyl, the isopropyl, the n-butyl, the n-amyl and the n-hexyl groups. Similarly, the methyl, the ethyl and the n-propyl groups are illustrative of the alkyl groups Y represents.

The following examples illustrate the azo compounds of our invention and their manner of preparation:

EXAMPLE 1

A. Preparation of nitrosyl sulfuric acid 1.52 grams (0.022 mole) of sodium nitrite were added portionwise to 10 cc. of concentrated sulfuric acid, with stirring, and the temperature of the reaction mixture was allowed to rise to 65° C. The resulting solution was then cooled to 5° C. and 20 cc. of a mixture of 3 cc. of propionic acid and 17 cc. of acetic acid were added dropwise, with stirring, while allowing the temperature to rise to 15° C. and maintaining it at this temperature during the remainder of the addition.

B. Diazotization

The nitrosyl sulfuric acid mixture prepared as described above was cooled to 0° C.–5° C. and then 2.9 grams (0.02 mole) of 2-amino-5-nitrothiazole were added portionwise, while stirring, after which 20 cc. of a propionic-acetic acid mixture prepared as described above were added while keeping the temperature of the reaction mixture at 0° C.–5° C. The reaction mixture thus obtained was then stirred at 0° C.–5° C. for two hours and excess sodium nitrite present in the mixture was destroyed by adding one gram of urea. A clear diazonium solution was obtained.

C. Coupling 10 cc. (0.004 mole) of the 2-amino-5-nitrothiazole diazonium solution prepared as described in B above were added, with stirring, at 0° C.–5° C. to a solution of 1.12 grams (0.004 mole) of N-n-butyl-N-β,γ-dihydroxypropyl-m-acetylaminoaniline in 10 cc. of a 1:6 mixture of propionic-acetic acid (i. e. 1 part by volume of propionic acid to 6 parts by volume of acetic acid) cooled in an ice bath. After a short time the mineral acid was neutralized by adding sodium acetate portionwise and then the reaction mixture was poured into ice water and after stirring a short time, it was filtered to recover the precipitated dye compound on the filter. The dye compound thus obtained was washed well with water and dried. 1.13 grams of the dye compound having the formula:

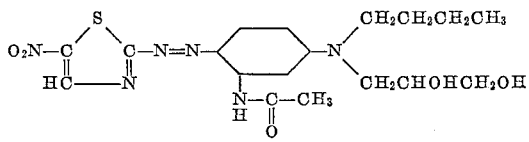

were obtained. It dyes cellulose acetate textile materials deep, bright greenish-blue shades which have good light fastness and excellent gas fastness. The compound has excellent affinity for cellulose acetate fabrics. Its dyeings on cellulose acetate textile materials give sharp and white discharges. The compound of this example also dyes wool, nylon, silk and polyethylene terephthalate textile materials deep shades of greenish-blue. The dye has the advantage of not appearing to show a red shift in shade when moved from daylight to artificial light.

EXAMPLE 2

This example describes a method of coupling in which the nitrosyl sulfuric-acetic acid solution of the diazonium compound prepared as in Example 1, is coupled with a 10% sulfuric acid solution of the coupling compound, followed by drowning in water. This method does not require neutralization of the mineral acid.

To a solution of 1.06 grams (0.004 mole) of N-n-butyl-N-β-hydroxypropyl-m-acetylaminoaniline in 5 to 7 cc. of 10% sulfuric acid cooled to −5° C. in an acetone-Dry Ice bath (or an ice-salt bath), was added, with stirring, 10 cc. of the 2-amino-5-nitrothiazole diazonium solution prepared as described in B of Example 1. The diazonium solution was added at such a rate that the temperature of the reaction mixture remained at 0 to 5° C. The coupling reaction which takes place was allowed to proceed for 10 to 15 minutes and then the reaction mixture was drowned in 200 cc. of water, with stirring. The drowned reaction mixture was allowed to stand for about one hour, after which it was filtered to recover the dye compound formed on the filter. The dye compound thus obtained was washed with water until neutral and air dried. One gram of a dye which colors cellulose acetate, wool, nylon and polyethylene terephthalate textile materials greenish-blue shades having excellent light and gas fastness was obtained as a dark powder. The cellulose acetate fabrics dyed with it gave sharp white discharge prints.

EXAMPLE 3

This example describes a method of diazotizing 2-amino-5-nitrothiazole in 62% sulfuric acid without the use of the acetic-propionic acid used in Example 1.

A. *Diazotization*

Nitrosyl sulfuric acid was prepared by adding 1.52 grams of sodium nitrite portionwise to 10 cc. of concentrated sulfuric acid, with stirring, and allowing the temperature to rise to 65° C. After the addition of sodium nitrite was complete, the resulting solution was stirred vigorously and was cooled to −5 to −10° C. with a trichloroethylene-Dry Ice bath. 5 grams of finely crushed ice were then added, with stirring, and at such a rate that the temperature did not rise above 10° C. The dilute nitrosyl sulfuric acid solution thus obtained was then cooled to −5 to −10° C. and 25 grams of 50% sulfuric acid were added dropwise while maintaining the temperature at −5° C. To this approximately 62% nitrosyl sulfuric acid solution maintained at −5° C. were then added 2.9 grams of finely divided 2-amino-5-nitrothiazole in three portions over a period of about five minutes and with vigorous stirring. The diazotization reaction which takes place was allowed to proceed for 10 to 15 minutes at −5 to −10° C., after which the 2-amino-5-nitrothiazole diazonium solution so prepared should be used immediately.

A solution of 1 gram (0.004 mole) of N-n-butyl-N-β-hydroxyethyl-m-acetylaminoaniline in 5 to 7 cc. of 10% sulfuric acid was cooled to −5° C. and 7 cc. (0.004 mole) of the 2-amino-5-nitrothiazole diazonium solution prepared as described above was added portionwise, with stirring, while preventing the temperature from rising above 0° C. The coupling reaction which takes place was allowed to proceed for 10 to 15 minutes, after which the reaction mixture was drowned in 150 cc. of water (25° C.) with stirring. After the drowned reaction mixture had stood at room temperature for one hour, it was filtered and the dye compound recovered on the filter was washed well with water and air dried. 1.1 grams of a dye which colors cellulose acetate textile materials greenish-blue shades which have excellent fastness to gas and good fastness to light were obtained as a dark powder.

EXAMPLE 4

A solution of 0.95 gram of N,N-di-β-hydroxyethyl-m-acetylaminoaniline in 7 cc. of 10% sulfuric acid was treated with 10 cc. of a 2-amino-5-nitrothiazole diazonium solution prepared in accordance with the procedure described in Example 1. Coupling and recovery of the dye compound formed were carried out in accordance with the procedure described in Example 2. 1.18 grams of a blue dye which has the same fastness properties as the dye of Example 2 were obtained.

EXAMPLE 5

By the use of one gram of N,N-di-β-hydroxyethyl-m-propionylaminoaniline in place of N-n-butyl-N-β-hydroxypropyl-m-acetylaminoaniline in Example 2, 1.1 grams of a dye were obtained as a dark powder. It colors cellulose acetate, nylon, wool and polyethylene terephthalate textile materials deep shades of greenish-blue having good fastness to light and excellent fastness to gas and which discharge to a pure white.

EXAMPLE 6

By the use of 1.06 grams of N,N-di-β-hydroxypropyl-m-acetylaminoaniline in place of N-n-butyl-N-β-hydroxypropyl-m-acetylaminoaniline in Example 2, 1.02 grams of a dye were obtained. It colors cellulose acetate textile materials bright bluish-green shades which have good fastness to light and gas and which discharge to a pure white. It also dyes nylon, polyethylene terephthalate and wool textile materials bluish-green shades.

EXAMPLE 7

1.59 grams of 2-amino-4-methyl-5-nitrothiazole were diazotized and the diazonium compound obtained was coupled with 2.68 grams of N,N-di-β-hydroxyethyl-2-methoxy-5-acetylamino-aniline. Diazotization, coupling and recovery of the dye compound formed were carried out in accordance with the procedure described in Example 1. The dye compound obtained colors cellulose acetate textile materials bluish-green shades which have good fastness to light and excellent fastness to gas.

EXAMPLE 8

2.13 grams of 2-amino-4-trifluoromethyl-5-nitrothiazole were diazotized and the diazonium compound obtained was coupled with 2.80 grams of N-sec.-butyl-N-β-,γ-dihydroxypropyl-m-acetylaminoaniline. Diazotization, coupling and recovery of the dye compound formed were carried out in accordance with the procedure described in Example 1. The dye compound obtained colors cellulose acetate, nylon, wool and polyethylene terephthalate bluish-green shades which have good fastness to light and gas.

EXAMPLE 9

1.70 grams of 2-amino-4-cyano-5-nitrothiazole were diazotized and the diazonium compound obtained was coupled with 2.80 grams of N-isobutyl-N-β,γ-dihydroxypropyl - m - acetylaminoaniline. Diazotization, coupling and recovery of the dye compound formed were carried out in accordance with the procedure described in Example 2. The dye compound obtained colors cellulose acetate textile materials blue-green shades which have good fastness to light and excellent fastness to gas.

EXAMPLE 10

1.45 grams of 2-amino-5-nitrothiazole were diazotized and the diazonium compound obtained was coupled with 2.68 grams of N,N-di-β-hydroxyethyl-2-methoxy-5-acetylaminoaniline. Diazotization, coupling and recovery of the dye compound formed were carried out in accordance with the procedure described in Example 1. The dye compound obtained colors cellulose acetate textile materials bluish-green shades.

EXAMPLE 11

0.58 gram of 2-amino-5-nitrothiazole was diazotized and the diazonium compound obtained was coupled with 1.18 grams of N,N-di-β-hydroxyethyl-3,5-diacetylaminoaniline. Diazotization, coupling and recovery of the dye compound formed were carried out in accordance with the procedure described in Example 1. 1.25 grams of a dye compound which colors cellulose acetate textile materials blue-green shades having excellent fastness to light and gas were obtained. It likewise dyes wool, silk and polyethylene terephthalate textile materials blue-green shades.

EXAMPLE 12

1.73 grams of 2-amino-4-ethyl-5-nitrothiazole were diazotized and the diazonium compound obtained was coupled with 2.38 grams of N,N-di-β-hydroxyethyl-m-acetylaminoaniline. Diazotization, coupling and recovery of the dye compound formed were carried out in accordance with the procedure described in Example 1. The dye compound obtained colors cellulose acetate textile materials reddish-blue shades.

EXAMPLE 13

1.87 grams of 2-amino-4-n-propyl-5-nitrothiazole were diazotized and the diazonium compound obtained was coupled with 2.38 grams of N,N-di-β-hydroxyethyl-m-acetylaminoaniline. Diazotization, coupling and recovery of the dye compound formed were carried out in accordance with the procedure described in Example 1. The dye compound obtained colors cellulose acetate textile materials reddish-blue shades.

By the use of 2.01 grams of 2-amino-4-n-butyl-5-nitrothiazole in place of 2-amino-4-n-propyl-5-nitrothiazole in the above example a dye compound is obtained which colors cellulose acetate textile materials reddish-blue shades.

EXAMPLE 14

2.29 grams of 2-amino-4-n-hexyl-5-nitrothiazole were diazotized and the diazonium compound obtained was coupled with 2.52 grams of N-ethyl-N-β,γ-dihydroxypropyl - m - acetylaminoaniline. Diazotization, coupling and recovery of the dye compound formed were carried out in accordance with the procedure described in Example 1. The dye compound obtained colors cellulose acetate textile materials reddish-blue shades.

By the use of 2.15 grams of 2-amino-4-n-amyl-5-nitrothiazole in place of 2-amino-4-n-hexyl-5-nitrothiazole in the above example a dye compound is obtained which colors cellulose acetate textile materials reddish-blue shades.

EXAMPLE 15

2.66 grams of 2-amino-4-(m-nitrophenyl)-5-nitrothiazole were diazotized and the diazonium compound obtained was coupled with 2.38 grams of N,N-di-β-hydroxyethyl-m-acetylaminoaniline. Diazotization, coupling and recovery of the dye compound formed were carried out in accordance with the procedure described in Example 1. The dye compound obtained colors cellulose acetate textile materials greenish-blue shades.

EXAMPLE 16

2.66 grams of 2-amino-4-(p-nitrophenyl)-5-nitrothiazole were diazotized and the diazonium compound obtained was coupled with 2.38 grams of N,N-di-β-hydroxyethyl-m-acetylaminoaniline. Diazotization, coupling and recovery of the dye compound formed were carried out in accordance with the procedure described in Example 1. The dye compound obtained colors cellulose acetate textile materials greenish-blue shades.

EXAMPLE 17

1.45 grams of 2-amino-5-nitrothiazole were diazotized and the diazonium compound obtained was coupled with 2.08 grams of N-methyl-N-β-hydroxyethyl-m-acetylaminoaniline. Diazotization, coupling and recovery of the dye compound formed were carried out in accordance with the procedure described in Example 1. The dye compound obtained colors cellulose acetate textile materials blue shades.

EXAMPLE 18

1.45 grams of 2-amino-5-nitrothiazole were diazotized and the diazonium compound obtained was coupled with 2.36 grams of N-ethyl-N-β-hydroxypropyl-m-acetylaminoaniline. Diazotization, coupling and recovery of the dye compound formed were carried out in accordance with the procedure described in Example 1. The dye compound obtained colors cellulose acetate textile materials blue shades.

EXAMPLE 19

1.45 grams of 2-amino-5-nitrothiazole were diazotized and the diazonium compound obtained was coupled with 2.78 grams of N-n-hexyl-N-β-hydroxyethyl-m-acetylamino aniline. Diazotization, coupling and recovery of the dye compound formed were carried out in accordance with the procedure described in Example 1. The dye compound obtained colors cellulose acetate textile materials blue shades.

By the use of 2.64 grams of N-n-amyl-N-β-hydroxyethylaniline in place of N-n-hexyl-N-β-hydroxyethyl-m-acetylaminoaniline in the above example, a dye compound is obtained which colors cellulose acetate textile materials blue shades.

EXAMPLE 20

1.45 grams of 2-amino-5-nitrothiazole were diazotized and the diazonium compound obtained was coupled with 3.51 grams of N,N-di-β-hydroxyethyl-3,5-di-n-butyrylaminoaniline. Diazotization, coupling and recovery of the dye compound formed were carried out in accordance with the procedure described in Example 1. The dye compound obtained colors cellulose acetate textile materials greenish-blue shades.

EXAMPLE 21

1.45 grams of 2-amino-5-nitrothiazole were diazotized and the diazonium compound obtained was coupled with 2.95 grams of N,N-di-β-hydroxyethyl-2,5-diacetylaminoaniline. Diazotization, coupling and recovery of the dye compound formed were carried out in accordance with the procedure described in Example 1. The dye compound obtained colors cellulose acetate textile materials greenish-blue shades.

EXAMPLE 22

1.45 grams of 2-amino-5-nitrothiazole were diazotized and the diazonium compound obtained was coupled with 3.51 grams of N,N-di-β-hydroxyethyl-2,5-di-n-butyrylaminoaniline. Diazotization, coupling and recovery of the dye compound formed were carried out in accordance with the procedure described in Example 1. The dye compound obtained colors cellulose acetate textile materials greenish-blue shades.

EXAMPLE 23

1.45 grams of 2-amino-5-nitrothiazole were diazotized and the diazonium compound obtained was coupled with 2.66 grams of N,N-di-γ-hydroxypropyl-m-acetylaminoaniline. Diazotization, coupling and recovery of the dye compound formed were carried out in accordance with the procedure described in Example 1. The dye compound obtained colors cellulose acetate textile materials blue shades.

EXAMPLE 24

1.45 grams of 2-amino-5-nitrothiazole were diazotized and the diazonium compound obtained was coupled with 2.50 grams of N-ethyl-N-δ-hydroxybutyl-m-acetylaminoaniline. Diazotization, coupling and recovery of the dye compound formed were carried out in accordance with the procedure described in Example 1. The dye compound obtained colors cellulose acetate textile materials blue shades.

EXAMPLE 25

1.45 grams of 2-amino-5-nitrothiazole were diazotized and the diazonium compound obtained was coupled with 2.81 grams of N-ethyl-N-δ,ε-dihydroxyamyl-m-acetylaminoaniline. Diazotization, coupling and recovery of the dye compound formed were carried out in accordance with the procedure described in Example 1. The dye compound obtained colors cellulose acetate textile materials blue shades.

EXAMPLE 26

1.45 grams of 2-amino-5-nitrothiazole were diazotized and the diazonium compound obtained was coupled with 2.64 grams of N-ethyl-N-ε-hydroxyamyl-m-acetylaminoaniline. Diazotization, coupling and recovery of the dye compound formed were carried out in accordance with the procedure described in Example 1. The dye compound obtained colors cellulose acetate textile materials blue shades.

The compounds tabulated hereinafter further illustrate the compounds of our invention. These compounds are prepared by diazotizing the diazo components named hereinafter and coupling the diazonium compounds obtained with the coupling components named hereinafter. The color given is that which the compounds color cellulose acetate. The diazotization, coupling and recovery operations are carried out in accordance with the procedure described hereinbefore.

TABLE I

[Diazo component: 2-amino-5-nitrothiazole.]

| Coupling Component | Color |
|---|---|
| 1. N,N-di-β-hydroxyethyl-2-ethoxy-5-acetylaminoaniline. | greenish-blue. |
| 2. N-ethyl-N-β,γ-dihydroxypropyl-2-methoxy-5-acetylaminoaniline. | Do. |
| 3. N-n-propyl-N-β,γ-dihydroxypropyl-m-acetylaminoaniline. | blue. |
| 4. N-n-butyl-N-β-hydroxyethyl-m-propionylaniline. | Do. |
| 5. N,N-di-β-hydroxypropyl-m-butyrylaminoaniline. | Do. |
| 6. N,N-di-β-hydroxypropyl-2,5-diacetylaminoaniline. | greenish-blue. |
| 7. N-isopropyl-N-β,γ-dihydroxypropyl-m-acetylaminoaniline. | blue. |
| 8. N-ethyl-N-β,γ-dihydroxypropyl-m-acetylaminoaniline. | Do. |
| 9. N-methyl-N-γ-hydroxypropyl-m-acetylaminoaniline. | Do. |

TABLE II

[Diazo Components: 2-amino-4-methyl-5-nitrothiazole, 2-amino-4-ethyl-5-nitrothiazole, 2-amino-4-n-butyl-5-nitrothiazole and 2-amino-4-n-hexyl-5-nitrothiazole.]

| Coupling Component | Color |
|---|---|
| 1. N-n-butyl-N-β,γ-dihydroxypropyl-m-acetylaminoaniline. | greenish-blue. |
| 2. N-n-butyl-N-β-hydroxypropyl-m-acetylaminoaniline. | blue. |
| 3. N-n-butyl-N-β-hydroxyethyl-m-acetylaminoaniline. | Do. |
| 4. N,N-di-β-hydroxyethyl-m-acetylaminoaniline. | Do. |
| 5. N,N-di-β-hydroxyethyl-m-propionylaminoaniline. | greenish-blue. |
| 6. N,N-di-β-hydroxypropyl-m-acetylaminoaniline. | blue. |
| 7. N,N-di-β-hydroxyethyl-2-methoxy-5-acetylaminoaniline. | bluish-green. |
| 8. N,N-di-β-hydroxyethyl-2-ethoxy-5-acetylaminoaniline. | Do. |
| 9. N-ethyl-N-β,γ-dihydroxypropyl-2-methoxy-5-acetylaminoaniline. | Do. |
| 10. N-sec.-butyl-N-β,γ-dihydroxypropyl-m-acetylaminoaniline. | blue. |
| 11. N-isobutyl-N-β,γ-dihydroxypropyl-m-acetylaminoaniline. | Do. |
| 12. N-n-propyl-N-β,γ-dihydroxypropyl-m-acetylaminoaniline. | greenish-blue. |
| 13. N-n-butyl-N-β-hydroxyethyl-m-propionylaminoaniline. | Do. |
| 14. N,N-di-β-hydroxypropyl-m-butyrylaminoaniline. | blue. |
| 15. N,N-di-β-hydroxyethyl-3,5-diacetylaminoaniline. | greenish-blue. |
| 16. N,N-di-β-hydroxypropyl-2,5-diacetylaminoaniline. | Do. |
| 17. N-isopropyl-N-β,γ-dihydroxypropyl-m-acetylaminoaniline. | Do. |
| 18. N-ethyl-N-β,γ-dihydroxypropyl-m-acetylaminoaniline. | Do. |
| 19. N-methyl-N-γ-hydroxypropyl-m-acetylaminoaniline. | Do. |

TABLE III

[Diazo Components: 2-amino-4-trifluoromethyl-5-nitrothiazole and 2-amino-4-cyano-5-nitrothiazole.]

| Coupling Component | Color |
|---|---|
| 1. N-n-butyl-N-β,γ-dihydroxypropyl-m-acetylaminoaniline. | greenish-blue. |
| 2. N-n-butyl-N-β-hydroxypropyl-m-acetylaminoaniline. | Do. |
| 3. N-n-butyl-N-β-hydroxyethyl-m-acetylaminoaniline. | Do. |
| 4. N,N-di-β-hydroxyethyl-m-acetylaminoaniline. | blue. |
| 5. N,N-di-β-hydroxyethyl-m-propionylaminoaniline. | greenish-blue. |
| 6. N,N-di-β-hydroxypropyl-m-acetylaminoaniline. | Do. |
| 7. N,N-di-β-hydroxyethyl-2-methoxy-5-acetylaminoaniline. | bluish-green. |
| 8. N,N-di-β-hydroxyethyl-2-ethoxy-5-acetylaminoaniline. | Do. |
| 9. N-ethyl-N-β,γ-dihydroxypropyl-2-methoxy-5-acetylaminoaniline. | Do. |
| 10. N-sec.-butyl-N-β,γ-dihydroxypropyl-m-acetylaminoaniline. | blue. |
| 11. N-isobutyl-N-β,γ-dihydroxypropyl-m-acetylaminoaniline. | Do. |
| 12. N-n-propyl-N-β,γ-dihydroxypropyl-m-acetylaminoaniline. | greenish-blue. |
| 13. N-n-butyl-N-β-hydroxyethyl-m-propionylaminoaniline. | Do. |
| 14. N,N-di-β-hydroxypropyl-m-butyrylaminoaniline. | blue. |
| 15. N,N-di-β-hydroxyethyl-3,5-diacetylaminoaniline. | greenish-blue. |
| 16. N,N-di-β-hydroxypropyl-2,5-diacetylaminoaniline. | Do. |
| 17. N-isopropyl-N-β,γ-dihydroxypropyl-m-acetylaminoaniline. | Do. |
| 18. N-ethyl-N-β,γ-dihydroxypropyl-m-acetylaminoaniline. | Do. |
| 19. N-methyl-N-γ-hydroxypropyl-m-acetylaminoaniline. | Do. |

TABLE IV

[Diazo Components: 2-amino-4-phenyl-5-nitrothiazole, 2-amino-4-(m-nitrophenyl)-5-nitrothiazole and 2-amino-4-(p-nitrophenyl)-5-nitrothiazole.]

| Coupling Component | Color |
|---|---|
| 1. N-n-butyl-N-β,γ-dihydroxypropyl m-acetylaminoaniline. | greenish-blue. |
| 2. N-n-butyl-N-β-hydroxypropyl-m-acetylaminoaniline. | Do. |
| 3. N-n-butyl-N-β-hydroxyethyl-m-acetylaminoaniline. | Do. |
| 4. N,N-di-β-hydroxyethyl-m-acetylaminoaniline. | blue. |
| 5. N,N-di-β-hydroxyethyl-m-propionylaminoaniline. | greenish-blue. |
| 6. N,N-di-β-hydroxypropyl-m-acetylaminoaniline. | Do. |
| 7. N,N-di-β-hydroxyethyl-2-methoxy-5-acetylaminoaniline. | bluish-green. |
| 8. N,N-di-β-hydroxyethyl-2-ethoxy-5-acetylaminoaniline. | Do. |
| 9. N-ethyl-N-β,γ-dihydroxypropyl-2-methoxy-5-acetylaminoaniline. | Do. |
| 10. N-sec.-butyl-N-β,γ-dihydroxypropyl-m-acetylaminoaniline. | blue. |
| 11. N-isobutyl-N-β,γ-dihydroxypropyl-m-acetylaminoaniline. | Do. |
| 12. N-n-propyl-N-β,γ-dihydroxypropyl-m-acetylaminoaniline. | greenish-blue. |
| 13. N-n-butyl-N-β hydroxyethyl-m-propionylaminoaniline. | Do. |
| 14. N,N-di-β-hydroxypropyl-m-butyrylaminoaniline. | blue. |
| 15. N,N-di-β-hydroxyethyl-3,5-diacetylaminoaniline. | greenish-blue. |
| 16. N,N-di-β-hydroxypropyl-2,5-diacetylaminoaniline. | Do. |
| 17. N-isopropyl-N-β,γ-dihydroxypropyl-m-acetylaminoaniline. | Do. |
| 18. N-ethyl-N-β,γ-dihydroxypropyl-m-acetylaminoaniline. | Do. |
| 19. N-methyl-N-γ-hydroxypropyl-m-acetylaminoaniline. | Do. |
| 20. N-ethyl-N-β-methyl-B,γ-dihydroxypropyl-m-acetylaminoaniline. | Do. |
| 21. N-ethyl-N-β-methyl-β,γ-dihydroxypropyl-2-methoxy-5-acetylaminoaniline. | bluish-green. |

In order that the preparation of the azo compounds of our invention may be entirely clear the preparation of certain intermediates used in their manufacture is described hereinafter.

*2-amino-4-phenylthiazole.*—160 grams of bromine were added dropwise, with stirring, to a slurry of 120 grams of acetophenone and 152 grams of thiourea in a suitable reaction vessel. Heat was evolved and stirring became difficult.

The reaction mixture was heated on a steam bath overnight after which 2.5 liters of hot water (85° C.→) were added. The reaction mixture was stirred to effect solution and then filtered while hot. On cooling, the hydrobromide salt of 2-amino-4-phenylthiazole crystallized. Then concentrated ammonium hydroxide was added to the cold reaction mixture until it became slightly alkaline. The reaction mixture was filtered and the 2-amino-4-phenylthiazole collected on the filter was washed once with water and dried. A yield of 126 grams was thus obtained. Upon recrystallization from ethyl alcohol 2-amino-4-phenylthiazole melting at 144° C.–146° C. was obtained.

*2-amino-4-(m-nitrophenyl)thiazole.*—160 grams of bromine were added dropwise, with stirring, to a mixture of 165 grams of m-nitroacetophenone and 152 grams of thiourea in a suitable reaction vessel. Toward the end of the bromine addition the reaction mixture became a slurry.

After heating on a steam bath overnight, the reaction product was dissolved by pouring the reaction mixture into 4 liters of hot water and the resulting solution was filtered while hot. Upon cooling, the hydrobromide salt of 2-amino-4-(m-nitrophenyl)thiazole crystallized. Then concentrated ammonium hydroxide was added to the cold reaction mixture until it became slightly alkaline. The reaction mixture was filtered and the 2-amino-4-(m-nitrophenyl)thiazole collected on the filter was washed once with water and dried. The yield of crude product was 87% of the theory. Upon recrystallization twice from ethyl alcohol 2-amino-4-(m-nitrophenyl)thiazole melting at 178° C.–180° C. was obtained.

*2-amino-4-(m-nitrophenyl)-5-nitrothiazole.*—60 grams of 2-amino-4-(m-nitrophenyl)thiazole were dissolved at 15° C. in 300 cc. of $H_2SO_4$. 13.3 cc. of fuming nitric acid (90%, density 1.5, 5% excess) were added at 10° C.–15° C. and the reaction mixture was allowed to stand overnight. Then the reaction mixture was stirred into ice and the reaction product filtered off. The reaction product was slurried with sodium bicarbonate until neutral and then with water. Upon recrystallization from nitrobenzene the 2-amino-4-(m-nitrophenyl)-5-nitrothiazole reaction product melted at 236–237° C.

*2-acetamido-4-phenylthiazole.*—15 grams of 2-amino-4-phenylthiazole were heated on a steam bath with 50 cc. of acetic anhydride. Solution first occurred and then the reaction product precipitated. The reaction mixture was cooled, poured into water and stirred until excess acetic anhydride had reacted. Then the reaction mixture was filtered and the 2-acetamido-4-phenylthiazole collected on the filter was dried. Upon recrystallization from ethyl alcohol it melted at 206° C.–208° C.

*2-amino-4-phenyl-5-nitrothiazole.*—The 2-acetamido-4-phenylthiazole prepared as described above was nitrated in sulfuric acid with fuming nitric acid in accordance with the procedure described in connection with 2-amino-4-(m-nitrophenyl)-5-nitrothiazole. Upon recrystallization from an acetic acid-water mixture the 2-acetamido-4-phenyl-5-nitrothiazole reaction product melted at 215° C.–224° C. 7 grams of the acetamido reaction product were hydrolyzed to the amino compound using 45 cc. of HCl, 90 cc. of $H_2O$ and 90 cc. of acetic acid. The 2-amino-4-phenyl-5-nitrothiazole thus obtained was recrystallized from nitrobenzene. The purified product sintered and darkened at 245° C. and decomposed at 260° C.

*2-amino-4-trifluoromethylthiazole.*—14 grams of 1-chloro-3,3,3-trifluoropropanone-2 and 7.26 grams of thiourea in 50 cc. of water were heated together on a steam bath for four hours. After cooling, the reaction mixture was made slightly basic with sodium carbonate. A yellow precipitate of 2-amino-4-trifluoromethylthiazole formed and was recovered by filtration and dried. 9.1 grams of product melting at 58° C.–60° C. were obtained.

*Analysis.*—Calculated for $C_4H_3F_3N_2S$: C, 28.57; H, 1.79; N, 16.67; S, 19.07. Found: C, 29.22; H, 1.95; N, 16.70; S, 19.28.

*2-amino-4-trifluoromethyl-5-nitrothiazole.*—This compound is prepared by nitrating 2-amino-4-trifluoromethylthiazole at 5° C.–10° C. in sulfuric acid with fuming nitric acid and allowing the reaction mixture to warm to room temperature overnight. The reaction mixture is then drowned on ice, neutralized with sodium carbonate and the precipitated 2-amino-4-trifluoromethyl-5-nitrothiazole is filtered of, washed with water and dried.

*2-amino-4-cyanothiazole.*—This compound is prepared by reacting equal molar quantities of thiourea and bromopyruvonitrile in ethyl alcohol.

*2-amino-4-cyano-5-nitrothiazole.*—This compound is prepared by nitrating 2-amino-4-cyanothiazole at 5° .C–10° C. in sulfuric acid with fuming nitric acid and allowing the reaction mixture to warm to room temperature overnight. The reaction mixture is then drowned on ice, neutralized with sodium carbonate and the precipitated 2-amino-4-cyano-5-nitrothiazole is filtered off, washed with water and dried.

*2-amino-4-methylthiazole.*—This compound melting at 44° C.–45° C. is obtained in a 70–75% yield by reacting thiourea and chloroacetone together in accordance with the procedure described by Byers and Dickey in Organic Syntheses, collective volume 2, page 31 (1943).

2-amino-4-alkylthiazole compounds having the general formula:

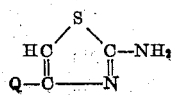

wherein Q represents an alkyl group having 1 to 6, inclusive, carbon atoms are prepared by reacting thiourea with a ketone having the formula:

wherein Q represents an alkyl group having 1 to 6, inclusive, carbon atoms. The reaction is carried out in accordance with the procedure used in preparing 2-amino-4-methylthiazole.

Compounds having the formula:

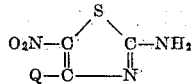

wherein Q represents an alkyl group having 1 to 6, inclusive, carbon atoms are prepared by nitrating the corresponding unnitrated compound with fuming nitric acid in sulfuric acid at a temperature of about 5° C. The reaction is carried out using the general procedure described in connection with the preparation of 2-amino-4-trifluoromethyl-5-nitrothiazole.

2-amino-4-phenyl-5-nitrothiazole and 2-amino-4-(m-nitrophenyl)-5-nitrothiazole also can be prepared by the procedures referred to in chapter 8 of Organic Reactions, volume VI, published by John Wiley and Sons, Inc. (e. g. see pages 380 and 398). The procedures described or indicated herein are used in the preparation of the other 2-amino-4-substituted phenyl-5-nitrothiazole compounds referred to herein.

*N,N - di - β - hydroxyethyl - m - acetylaminoaniline.*—This compound was prepared by heating m-aminoacetanilide with more than two equivalents of ethylene oxide in an autoclave at 180° C. for 8 hours.

*N,N - di - β - hydroxyethyl - 2 - ethoxy - 5 - acetylaminoaniline.*—This compound was prepared by heating 2-ethoxy-5-acetylaminoaniline with more than two equivalents of ethylene oxide in an autoclave at 180° C. for 8 hours.

*N,N - di - β - hydroxyethyl - 2 - methoxy - 5 - acetylaminoaniline.*—This compound was prepared by heating 2-methoxy-5-acetylaminoaniline with more than two equivalents of ethylene oxide in an autoclave at 180° C. for 8 hours.

*N,N - di - β - hydroxyethyl - m - propionylaminoaniline.*—This compound was prepared by heating m-propionylaminoaniline with more than two equivalents of ethylene oxide in an autoclave at 180° C. for 8 hours.

*N - n - butyl - N - β - hydroxyethyl - m - acetylaminoaniline.*—This compound was prepared by heating N-n-butyl-m-acetylaminoaniline with more than one equivalent of ethylene oxide in an autoclave at 180° C. N-n-butyl-m-acetylaminoaniline was prepared by reacting n-butyl bromide in n-butyl alcohol with m-aminoacetanilide at 100° C. in the presence of NaHCO₃.

*N - n - butyl - N - β,γ - dihydroxypropyl - m - acetylaminoaniline.*—This compound was prepared by reacting N-n-butyl-m-aminoacetanilide with 1-chloro-2,3-propanediol in the presence of NaHCO₃ at 130–150° C.

*N - n - butyl - N - β - hydroxypropyl - m - acetylaminoaniline.*—This compound was prepared by reacting N-n-butyl-m-aminoacetanilide with an excess of propylene oxide in an autoclave at 180° C.

*N - sec. - butyl - N - β,γ - dihydroxypropyl - m - acetylaminoaniline.*—This compound was prepared by reacting N-sec.-butyl-m-aminoacetanilide with 1-chloro-2,3-propanediol in the presence of NaHCO₃ at 130–150° C.

*N - isobutyl - N - β,γ - dihydroxypropyl - m - acetylaminoaniline.*—This compound was prepared by reacting N-isobutyl-m-aminoacetanilide with 1-chloro-2,3-propanediol in the presence of NaHCO₃ at 130–150° C.

*N - ethyl - N - β,γ - dihydroxypropyl - 2 - methoxy - 5 - acetylaminoaniline.*—This compound was prepared by reacting 2-methoxy-5-acetylaminoaniline with one equivalent of ethyl bromide and then reacting the resulting N-ethyl-2-methoxy-5-acetylaminoaniline with 1-chloro-2,3-propanediol in the presence of NaHCO₃ at 130–150° C.

*N,N - di - β - hydroxyethyl-3,5-diacetylaminoaniline.*—This compound was prepared as follows: 1,3,5-trinitrobenzene was reduced with alcoholic ammonium sulfide to give 3,5-diaminonitrobenzene. The 3,5-diaminonitrobenzene thus obtained was diacetylated, following which the nitro group was reduced with hydrogen in the presence of Raney nickel to give 3,5-diacetylaminoaniline which was heated with more than two equivalents of ethylene oxide in an autoclave at 180° C. for 8 hours to form N,N-di-β-hydroxyethyl-3,5-diacetylaminoaniline.

The azo dye compounds of our invention can be applied to the textile materials named hereinbefore in the form of an aqueous dispersion and are ordinarily so applied. To illustrate, the dye compound is finely ground with a dispersing agent such as sodium lignin sulfonate, Turkey red oil, soap, or an oleyl glyceryl sulfate and the resulting mixture is dispersed in water. The dye bath thus prepared is heated to a temperature approximating 45° C.– 55° C. and the textile material to be dyed is immersed in the dyebath, following which the temperature is gradually raised to 80° C.– 90° C. and maintained at this temperature until dyeing is complete, usually one-half to two hours. From time to time throughout the dyeing operation, the material is worked to promote even dyeing. Upon completion of the dyeing operation, the textile material is removed from the dyebath, washed with an aqueous soap solution, rinsed well with water and dried.

Widely varying amounts of dye can be used in the dyeing operation. The amount of dye used can be, for example, ⅓ to 3% (by weight) of that of the textile material although lesser or greater amounts of dye can be employed.

This application is a continuation-in-part of our prior copending application Serial No. 233,243, filed June 23, 1951, now U. S. Patent 2,659,719, issued November 17, 1953.

We claim:

1. The azo compounds selected from the azo compounds having the formulas:

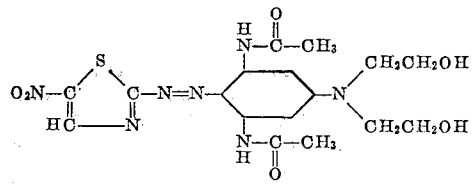

and

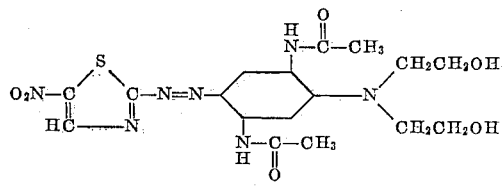

2. The azo compound having the formula:

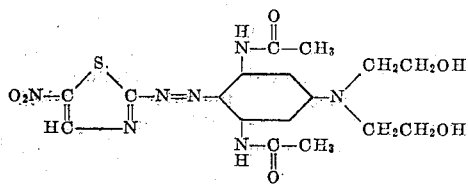

3. The azo compound having the formula:
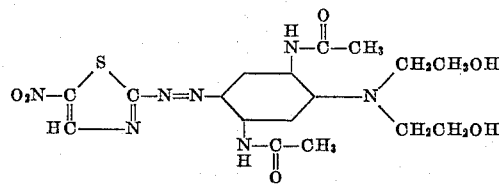
References Cited in the file of this patent
UNITED STATES PATENTS
| 2,345,010 | Seymour et al. | Mar. 28, 1944 |
| 2,659,719 | Dickey, et al. | Nov. 17, 1953 |
FOREIGN PATENTS
| 587,134 | Great Britain | Apr. 15, 1947 |
OTHER REFERENCES
Venkataraman, Synthetic Dyes, 1952, vol. I, page 460.